(12) United States Patent
Kehoe et al.

(10) Patent No.: US 9,221,112 B2
(45) Date of Patent: Dec. 29, 2015

(54) MOTOR MOUNT FOR A POWER TOOL

(75) Inventors: Sean T. Kehoe, Waukesha, WI (US);
Benjamin Ludy, Milwaukee, WI (US);
Troy C. Thorson, Cedarburg, WI (US);
Michael Naughton, Oconomowoc, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 764 days.

(21) Appl. No.: 13/551,756

(22) Filed: Jul. 18, 2012

(65) Prior Publication Data

US 2013/0014968 A1 Jan. 17, 2013

Related U.S. Application Data

(63) Continuation-in-part of application No. 12/721,210, filed on Mar. 10, 2010, now Pat. No. 8,407,902, and a continuation-in-part of application No. 13/326,525, filed on Dec. 15, 2011, now Pat. No. 8,636,081, and a continuation-in-part of application No. 13/435,554, filed on Mar. 30, 2012.

(60) Provisional application No. 61/509,922, filed on Jul. 20, 2011, provisional application No. 61/470,620, filed on Apr. 1, 2011.

(51) Int. Cl.
*H02K 5/00* (2006.01)
*H02K 5/16* (2006.01)
*B23D 49/11* (2006.01)
*B23D 49/16* (2006.01)
*B23D 51/16* (2006.01)
(Continued)

(52) U.S. Cl.
CPC .............. *B23D 49/11* (2013.01); *B23D 49/162* (2013.01); *B23D 51/16* (2013.01); *B25F 5/02* (2013.01); *H02K 5/16* (2013.01); *B25D 2211/006* (2013.01); *H02K 7/08* (2013.01); *Y10T 29/49826* (2015.01); *Y10T 29/49963* (2015.01)

(58) Field of Classification Search
CPC .. B23D 51/16; B23D 49/11; B25D 2211/006; B25F 5/02; H02K 7/08
USPC ................... 30/392–394, 367; 310/50, 90–91
See application file for complete search history.

(56) References Cited

U.S. PATENT DOCUMENTS 2,373,842 A 4/1945 Mitchell
2,726,689 A 12/1955 Busby
(Continued)

FOREIGN PATENT DOCUMENTS

DE 60307170 8/2007
EP 0925880 6/1999
(Continued)

OTHER PUBLICATIONS

Bosch PS60-2A Parts Diagram (available Jun. 2011).
(Continued)

*Primary Examiner* — Burton Mullins
(74) *Attorney, Agent, or Firm* — Michael Best & Friedrich LLP (57) ABSTRACT

A power tool includes a motor having a can and a shaft extending axially from the can, a gear case having an inner surface that defines an opening, a bearing positioned around a portion of the shaft that extends from the can and at least partially within the opening in the gear case, and a motor mount coupled to the motor. The motor mount includes a flange extending away from the motor. The flange of the motor mount and the inner surface of the gear case axially and laterally locate the motor and the gear case on the bearing.

30 Claims, 11 Drawing Sheets

(51) Int. Cl.
*B25F 5/02* (2006.01)
*H02K 7/08* (2006.01)

(56) References Cited

U.S. PATENT DOCUMENTS

| | | | |
|---|---|---|---|
| 2,894,489 | A | 7/1959 | Clay |
| 3,939,599 | A | 2/1976 | Henry et al. |
| 4,081,704 | A | 3/1978 | Vassos et al. |
| 4,323,127 | A | 4/1982 | Cunningham |
| 5,246,414 | A | 9/1993 | Hallbach |
| 5,479,709 | A | 1/1996 | Lai |
| 5,558,166 | A | 9/1996 | Chen |
| 5,581,891 | A | 12/1996 | Wheeler et al. |
| 5,624,000 | A | 4/1997 | Miller |
| 5,692,421 | A | 12/1997 | Rohrberg |
| 5,960,687 | A | 10/1999 | Rohrberg |
| 6,520,397 | B1 | 2/2003 | Moeller |
| 6,619,527 | B1 | 9/2003 | Moeller |
| 6,935,547 | B2 | 8/2005 | Mochizuki |
| 6,971,951 | B2 | 12/2005 | Boyer |
| 7,011,243 | B2 | 3/2006 | Mochizuki |
| 7,040,520 | B2 | 5/2006 | Turk |
| 7,107,670 | B2 | 9/2006 | Fu et al. |
| 7,107,944 | B1 | 9/2006 | Heinzen |
| 7,109,613 | B2 | 9/2006 | Lui |
| 7,117,582 | B2 | 10/2006 | Fu et al. |
| 7,118,018 | B2 | 10/2006 | Turk |
| 7,140,331 | B1 | 11/2006 | Heinzen |
| 7,305,941 | B2 | 12/2007 | Akiba et al. |
| RE40,643 | E * | 2/2009 | Stirm ............................. 173/48 |
| 7,513,845 | B2 | 4/2009 | Ho |
| 7,568,602 | B2 | 8/2009 | Turk |
| 7,690,283 | B1 | 4/2010 | Hall et al. |
| 7,703,856 | B1 | 4/2010 | Duncan |
| 7,850,145 | B2 | 12/2010 | Heravi et al. |
| 7,938,305 | B2 | 5/2011 | Simonelli et al. |
| 7,959,415 | B2 | 6/2011 | Schuetzle et al. |
| 2004/0064907 | A1 | 4/2004 | Blaustein et al. |
| 2004/0074025 | A1 | 4/2004 | Blaustein et al. |
| 2004/0232194 | A1 | 11/2004 | Pedicini et al. |
| 2007/0180711 | A1 | 8/2007 | Park |
| 2008/0017689 | A1 | 1/2008 | Simonelli et al. |
| 2008/0048000 | A1 | 2/2008 | Simonelli et al. |
| 2009/0236387 | A1 | 9/2009 | Simonelli et al. |
| 2009/0250500 | A1 | 10/2009 | Brendel et al. |
| 2010/0162579 | A1 * | 7/2010 | Naughton et al. .............. 30/392 |
| 2010/0213236 | A1 | 8/2010 | Zhang et al. |
| 2010/0276168 | A1 | 11/2010 | Murthy et al. |

FOREIGN PATENT DOCUMENTS

| | | |
|---|---|---|
| EP | 1197300 | 4/2002 |
| EP | 1400318 | 3/2004 |
| EP | 1798000 | 6/2007 |
| EP | 1977987 | 10/2008 |
| EP | 2075094 | 7/2009 |
| WO | 03/015993 | 2/2003 |
| WO | 2004/032676 | 4/2004 |
| WO | 2004/035268 | 4/2004 |
| WO | 2010/104548 | 9/2010 |
| WO | 2013/089795 | 6/2013 |

OTHER PUBLICATIONS

Search Report from the United Kingdom Intellectual Property Office for Application No. 1212916.9 dated Nov. 19, 2012 (3 pages).
Australian Patent Examination Report No. 1 for Application No. 2012205232 dated Mar. 4, 2014 (7 pages).
GB1212916.9 Examination Report dated Mar. 11, 2015 (3 pages).
First Office Action from the German Patent Office for Application No. 10-2012-212771.2 dated May 28, 2013 (3 pages).

* cited by examiner

MOTOR MOUNT FOR A POWER TOOL

CROSS-REFERENCE TO RELATED APPLICATIONS

This application claims priority to U.S. Provisional Patent Application No. 61/509,922, filed Jul. 20, 2011, the entire contents of which are incorporated by reference herein.

This application is also a continuation-in-part of U.S. patent application Ser. No. 12/721,210, filed Mar. 10, 2010; a continuation-in-part of U.S. patent application Ser. No. 13/326,525, filed Dec. 15, 2011; and a continuation-in-part of U.S. patent application Ser. No. 13/435,554, filed Mar. 30, 2012, which claims priority to U.S. Provisional Patent Application No. 61/470,620, filed Apr. 1, 2011, the entire contents of all of which are incorporated by reference herein.

BACKGROUND

The present invention relates to power tools and, more particularly, to motor mounts for power tools.

Power tools including mounts for connecting motors to gear boxes are known. Such mounts, however, typically do not guarantee close axial alignment or fixed axial and lateral positions of all components within the power tools. If proper axial alignment is not maintained, side loading of the motor shaft and bearing may occur, which can lead to excessive current draw and possible mechanical failure. Furthermore, axial misalignment or loading can occur due to improper motor locating by a motor mount. For example, the motor mount can bias the motor out of alignment with the gear box, causing high current draw or other failures.

SUMMARY

In one embodiment, the invention provides a power tool including a motor having a can and a shaft extending axially from the can, a gear case having an inner surface that defines an opening, a bearing positioned around a portion of the shaft that extends from the can and at least partially within the opening in the gear case, and a motor mount coupled to the motor. The motor mount includes a flange extending away from the motor. The flange of the motor mount and the inner surface of the gear case axially and laterally locate the motor and the gear case on the bearing.

In another embodiment, the invention provides a method of connecting a motor to a gear case of a power tool. The motor includes a can and a shaft that extends axially from the can. The gear case includes an inner surface that defines an opening. The method includes providing a motor mounting system having a motor mount and a bearing. The motor mount has a flange. The method also includes coupling the motor mount to the motor such that the flange extends away from the motor, positioning the bearing around a portion of the shaft of the motor that extends from the can, inserting at least a portion of the bearing into the opening in the gear case, axially and laterally locating the gear case on the bearing with the inner surface of the gear case, and axially and laterally locating the motor on the bearing with the flange of the motor mount.

In yet another embodiment, the invention provides a power tool including a housing and a motor positioned substantially within the housing. The motor includes a can, a shaft extending axially from the can, and a pinion coupled to a portion of the shaft that extends from the can. The power tool also includes a gear case positioned substantially within the housing. The gear case includes an inner surface that defines an opening. The power tool further includes a bearing positioned around the portion of the shaft that extends from the can and at least partially within the opening in the gear case. The bearing includes an inner race that is secured to the pinion and an outer race. The power tool also includes a motor mount including a flange extending away from the motor and two radially-extending arms. The two arms are secured to the gear case. The power tool further includes two shoulder pins coupled to the can of the motor. The two shoulder pins extend into the motor mount to couple the motor mount to the motor. The inner surface of the gear case directly contacts the outer race of the bearing to axially and laterally locate the gear case on the bearing. The flange of the motor mount directly contacts one of the outer race of the bearing and the inner surface of the gear case to axially and laterally locate the motor on the bearing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
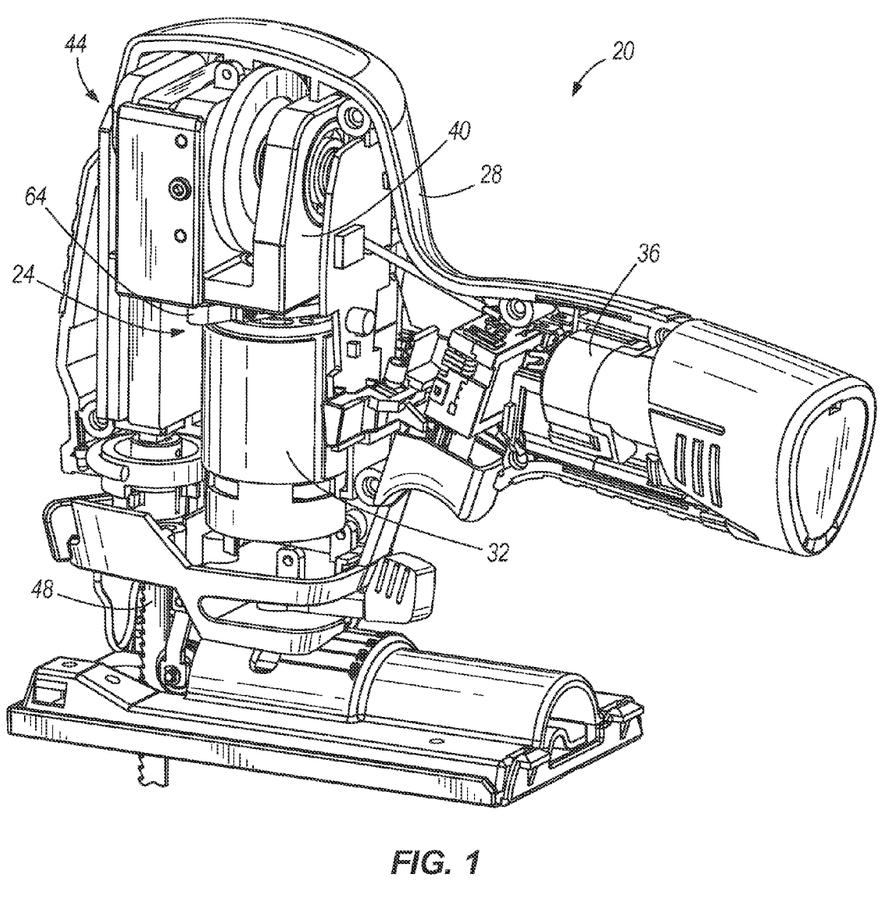
FIG. 1 is a perspective view of a jigsaw with a housing portion removed, the jigsaw including a motor mounting system according to one embodiment of the invention.

FIG. 1 illustrates a power tool 20 that includes a motor mounting system 24. In the illustrated embodiment, the power tool 20 is a jigsaw. In other embodiments, the power tool 20 may be, for example, a reciprocating saw, a bandsaw, a circular saw, a drill, a rotary hammer, a screwdriver, a disc sander, or the like.

The illustrated jigsaw 20 includes a housing 28, a motor 32 positioned substantially within the housing 28, a power source 36 electrically coupled the motor 32, a gear case 40 positioned substantially within the housing 28, a drive mechanism 44 supported by the gear case 40 and driven by the motor 32, and an output member 48 driven by the drive mechanism 44. The motor 32 is powered by the power source 36 which, in the illustrated embodiment, is a battery pack. In other embodiments, motor 32 may be powered by an AC power source. The drive mechanism 44 includes a drive gear 52 (FIG. 2) and converts rotary motion from the motor 32 into linear reciprocating motion of the output member 48. In the illustrated embodiment, the output member 48 is a saw blade. In other embodiments, the output member 48 may be, for example, a drill bit or a screwdriver bit, depending on the type of power tool being used.

Figure 2:
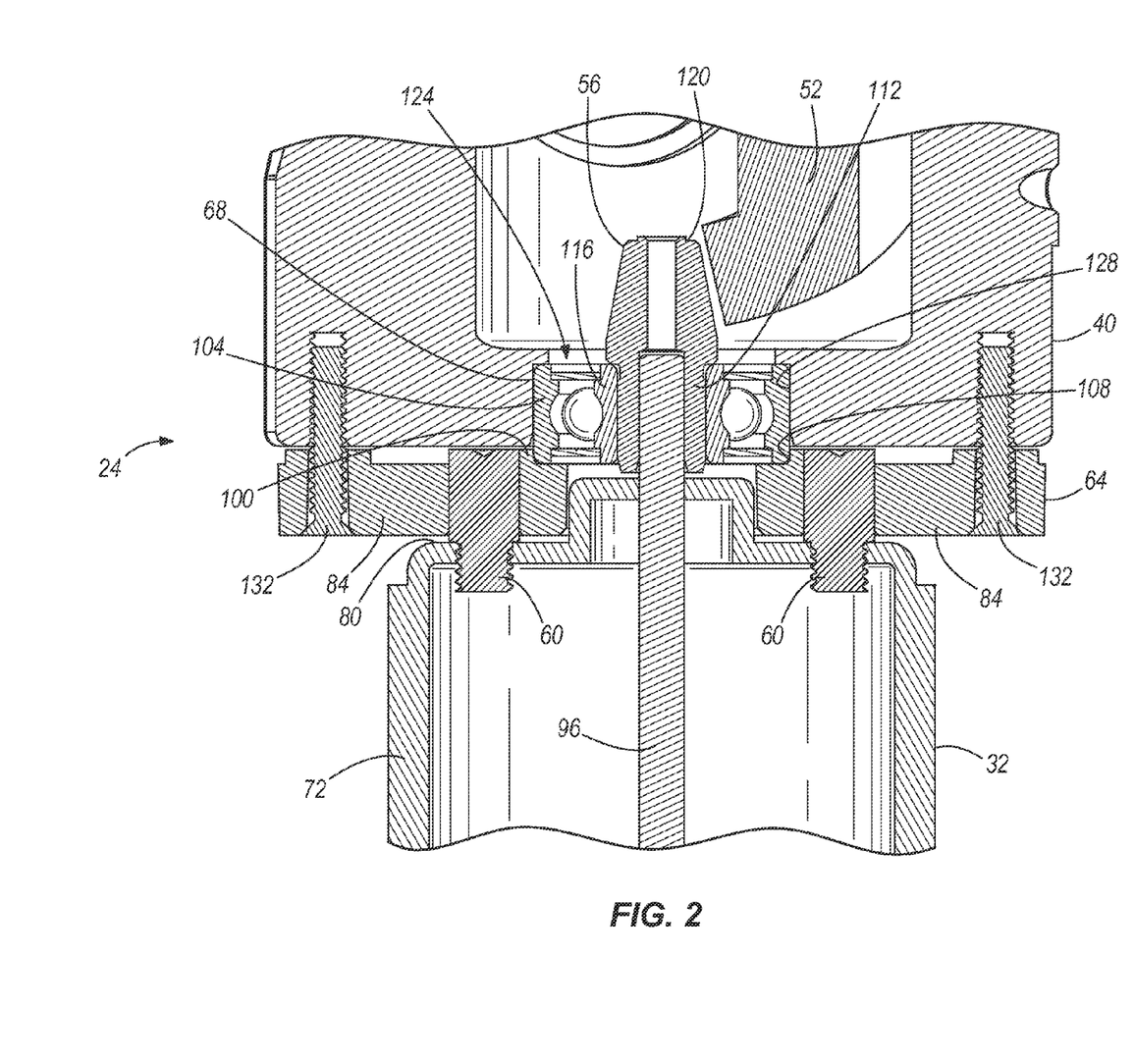
FIG. 2 is a cross-sectional view of the motor mounting system shown in FIG. 1.
Figure 3:
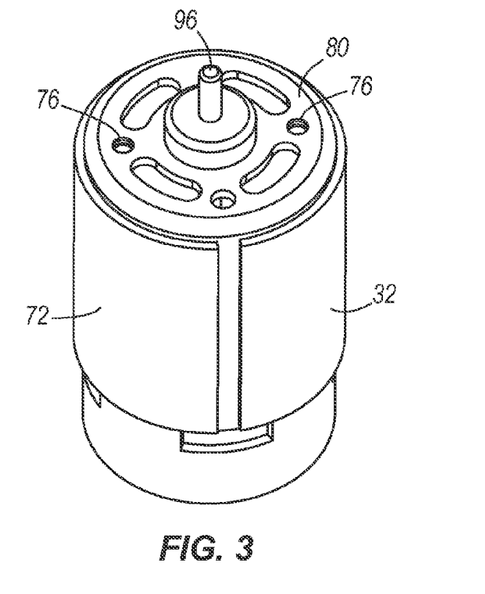
FIG. 3 is a perspective view of a motor for use with the jigsaw shown in FIG. 1.
Figure 4:
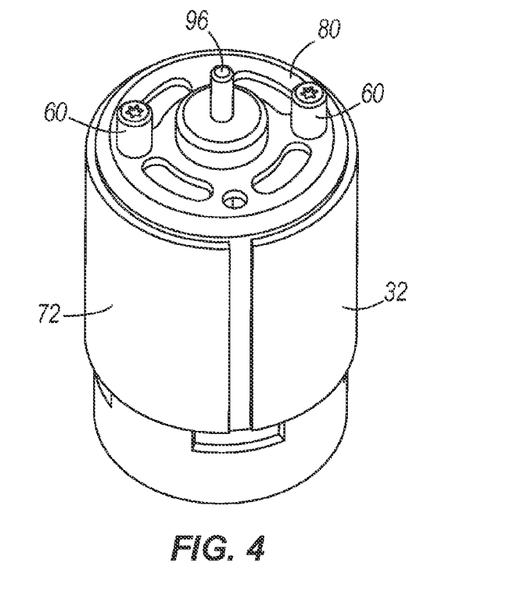
FIG. 4 is a perspective view of the motor shown in FIG. 3 with shoulder pins attached thereto.

As shown in FIG. 2, the motor mounting system 24 is positioned within the housing 28 and mounts the motor 32 to the gear case 40. The motor mounting system 24 fixes the motor 32 axially and laterally relative to the gear case 40 to maintain proper alignment between a motor pinion 56 of the motor 32 and the drive gear 52 of the drive mechanism 44. In the illustrated embodiment, the motor mounting system 24 includes two shoulder pins 60, a motor mount 64, and a bearing 68. Referring to FIGS. 3 and 4, the shoulder pins 60 are attached to a can 72 of the motor 32 and extend axially from the motor 32. The illustrated shoulder pins 60 are screwed into openings 76 formed in an end surface 80 of the motor can 72. In other embodiments, the shoulder pins 60 may be attached to the motor can 72 using other suitable fastening means.

Figure 5:
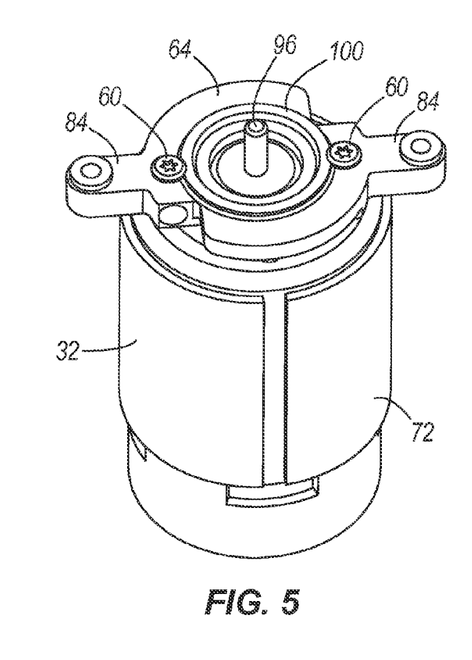
FIG. 5 is a perspective view of the motor shown in FIG. 4 with a motor mount attached thereto.
Figure 6:
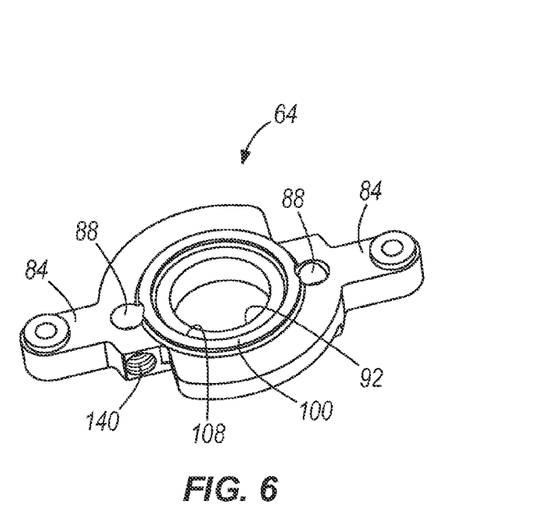
FIG. 6 is a perspective view of the motor mount shown in FIG. 5.

As shown in FIGS. 5 and 6, the motor mount 64 is positioned on the end surface 80 of the motor can 72 and includes two radially-extending arms 84 that attach to the gear case 40, as further discussed below. The shoulder pins 60 extend into two openings 88 in the motor mount 64 to help position the motor mount 64 on the motor can 72. The motor mount 64 also defines a relatively large central opening 92 that provides clearance for a motor shaft 96 extending axially from the can 72. A flange 100, or lip, surrounds the central opening 92 and extends outwardly from the motor mount 64.

In some embodiments, the motor mount 64 may include more than two radially-extending arms 84. For example, the motor mount 64 may include three or four arms that attach to the gear case 40. Similarly, the motor mount 64 may include more than two openings 88 for receiving shoulder pins 60. The illustrated motor can 72 includes four openings 76 that are configured to receive shoulder pins 60. As such, the motor mounting system 24 may include three or four shoulder pins 60 so that a shoulder pin is screwed into each opening 76. In addition, the motor mount 64 may include three or four openings 88 to receive the shoulder pins 60. In other embodiments, the motor can 72 may include fewer or more openings 76, the motor mounting system 24 may include a matching number of shoulder pins 60, and the motor mount 64 may include a matching number of opening 88.

Figure 7:
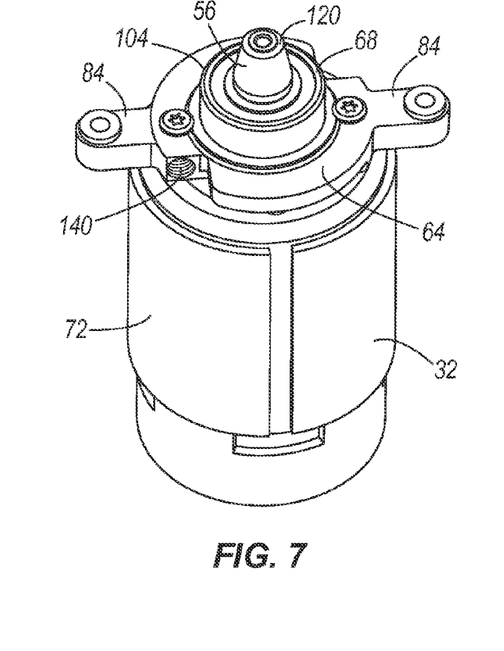
FIG. 7 is a perspective view of the motor and the motor mount shown in FIG. 5 with a bearing and a motor pinion attached thereto.
Figure 8:
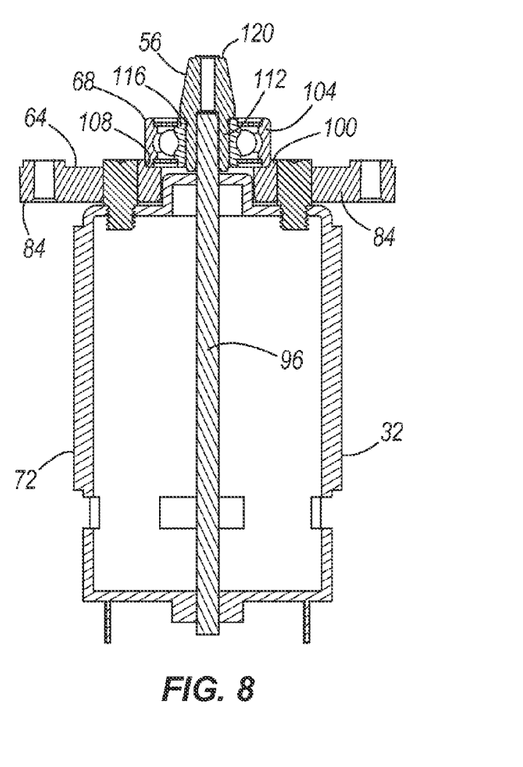
FIG. 8 is a cross-sectional view of the motor, the motor mount, the bearing, and the motor pinion shown in FIG. 7.

As shown in FIGS. 7 and 8, the bearing 68 and the motor pinion 56 are attached to the motor shaft 96, trapping the motor mount 64 between the motor can 72 and the bearing 68. In the illustrated embodiment, the bearing 68 is press-fit onto the motor pinion 56, and the motor pinion 56 is press-fit onto the shaft 96. The bearing 68 surrounds the motor shaft 96 and is positioned within the flange 100 of the motor mount 64 (FIG. 2). An outer race 104 of the bearing 68 rests on the motor mount 64 and engages an inner surface 108 of the flange 100. The inner surface 108 of the flange 100 thereby directly contacts the outer race 104 to locate the motor 32 on the bearing 68. A neck portion 112 of the motor pinion 56 extends through an inner race 116 of the bearing 68 and is fixed to the motor shaft 96 to rotate with the shaft 96. A gear portion 120 of the motor pinion 56 extends axially from the bearing 68 to engage the drive gear 52 (FIG. 2) of the drive mechanism 44.

Referring back to FIG. 2, after the motor mount 64 and the bearing 68 are coupled to the motor can 72, the motor pinion 56 and the bearing 68 are inserted into an opening 124 formed in the gear case 40. The opening 124 is defined by an inner surface 128 of the gear case 40. In the illustrated embodiment, the inner surface 128 of the gear case 40 and the inner surface 108 of the flange 100 are generally concentric and having similar diameters. Upon insertion of the motor pinion 56, the outer race 104 of the bearing 68 engages a portion of the inner surface 128. The inner surface 128 of the gear case 40 thereby directly contacts the outer race 104 to locate the gear case 40 on the bearing 68.

The arms 84 of the motor mount 64 are then connected to the gear case 40. In the illustrated embodiment, the arms 84 are secured to the gear case 40 by threaded fasteners 132. In other embodiments, the arms 84 may be secured to the gear case 40 by other suitable fastening means. When attached to the gear case 40, the motor mount 64 presses against a first face of the bearing 68 and the gear case 40 presses against a second face of the bearing 68 so that the bearing 68 is sandwiched between the motor mount 64 and the gear case 40. Thus, the bearing 68 and the motor pinion 56 are axially fixed relative to the gear case 40.

In the illustrated embodiment, the bearing 68 extends slightly out of the opening 124 in the gear case 40 such that, as the threaded fasteners 132 are tightened, the arms 84 of the motor mount 64 flex toward the gear case 40. As the arms 84 flex, the flange 100 applies a load to the outer race 104 of the bearing 68. The force applied by the flange 100 inhibits the outer race 104 from spinning when the motor 32 is running The motor mount 64 also laterally locates on the bearing 68 to maintain proper alignment between the motor pinion 56 and the drive gear 52, eliminating or reducing side loading on the motor shaft 96. In some embodiments, the flange 100 may be manufactured with a tight tolerance to the bearing 68 to laterally locate on the outer race 104.

Figure 9:
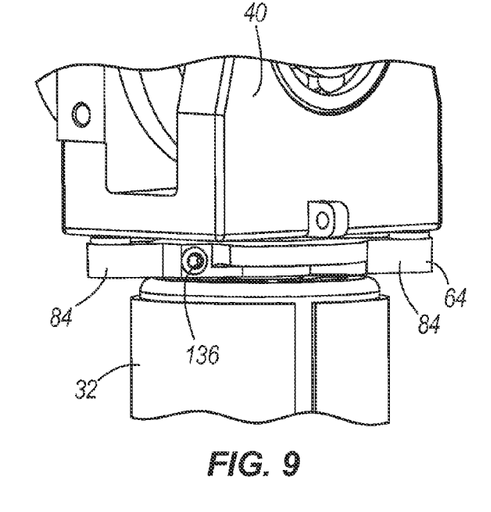
FIG. 9 is a side view of the motor mounting system connected to a gear case of the jigsaw shown in FIG. 1.
Figure 10:
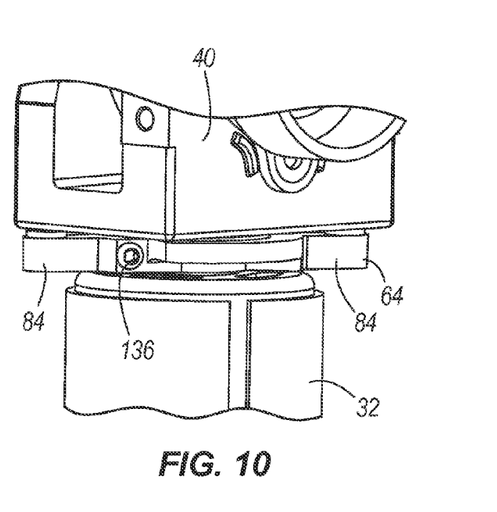
FIG. 10 is another side view of the motor mounting system connected to the gear case of the jigsaw shown in FIG. 1.

As shown in FIGS. 9 and 10, once the motor mount 64 is connected to the gear case 40, set screws 136 in the motor mount 64 are tightened. The set screws 136 extend through side openings 140 (only one of which is shown in FIG. 6) in the motor mount 64 and engage the shoulder pins 60 (FIG. 4). Tightening the set screws 136 helps hold the motor can 72 axially, radially, and laterally relative to the motor mount 64 and the gear case 40. The motor mount 64 thereby inhibits the motor 32 from sliding, rotating/spinning, or wobbling/pitching relative to the gear case 40 to maintain the motor can 72 in alignment with the motor shaft 96 and the bearing 68. In the illustrated embodiment, the motor mount 64 includes two set screws 136 that engage both shoulder pins 60. In other embodiments, the motor mount 64 may include a single set screw or the set screws 136 may be omitted. In still other embodiments, the motor mount 64 may include three or four set screws 136 to match the number of shoulder pins 60 that are coupled to the motor can 72.

Figure 11:
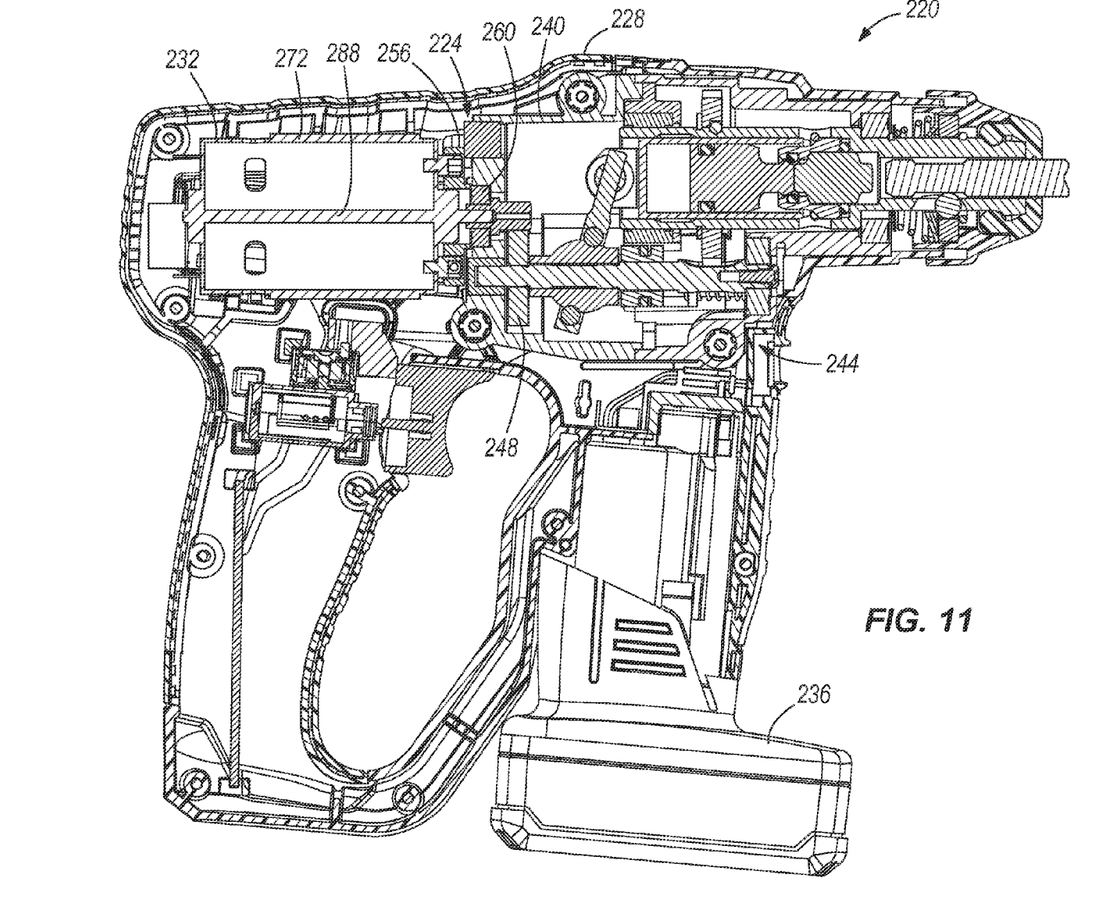
FIG. 11 is a cross-sectional view of a rotary hammer, the rotary hammer including another embodiment of a motor mounting system.

FIG. 11 illustrates another power tool 220 that includes a motor mounting system 224. In the illustrated embodiment, the power tool 220 is a rotary hammer. The rotary hammer 220 includes a housing 228, a motor 232 positioned substantially within the housing 228, a power source 236 electrically coupled to the motor 232, a gear case 240 positioned substantially within the housing 228, and a drive mechanism 244 supported by the gear case 240 and driven by the motor 232. The drive mechanism 244 includes a drive gear 248 and converts rotary motion of the motor 232 into linear reciprocating motion of an internal hammer and rotary motion of an output member (e.g., a drill bit).

Figure 12:
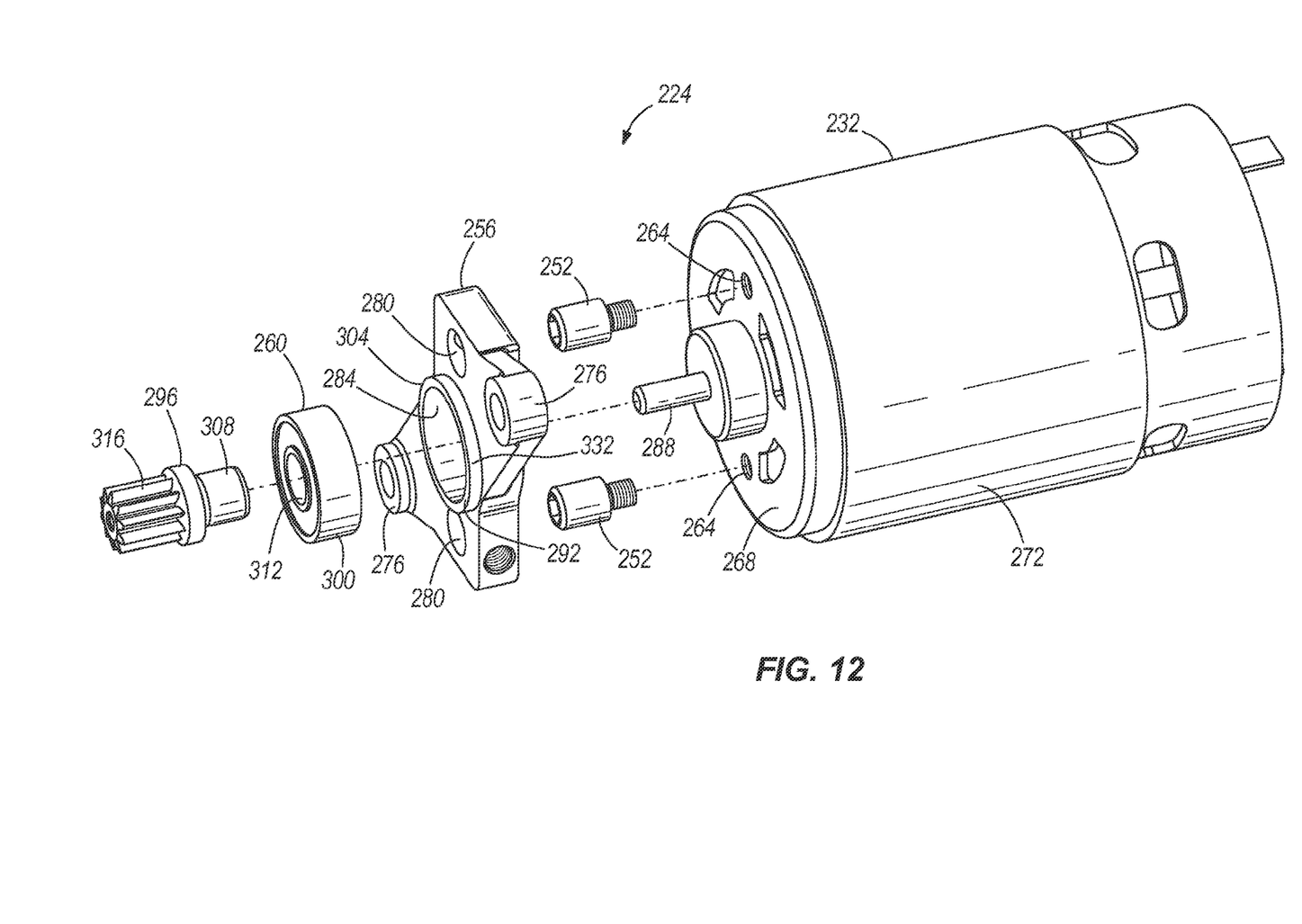
FIG. 12 is an exploded perspective view of the motor mounting system shown in FIG. 11.
Figure 13:
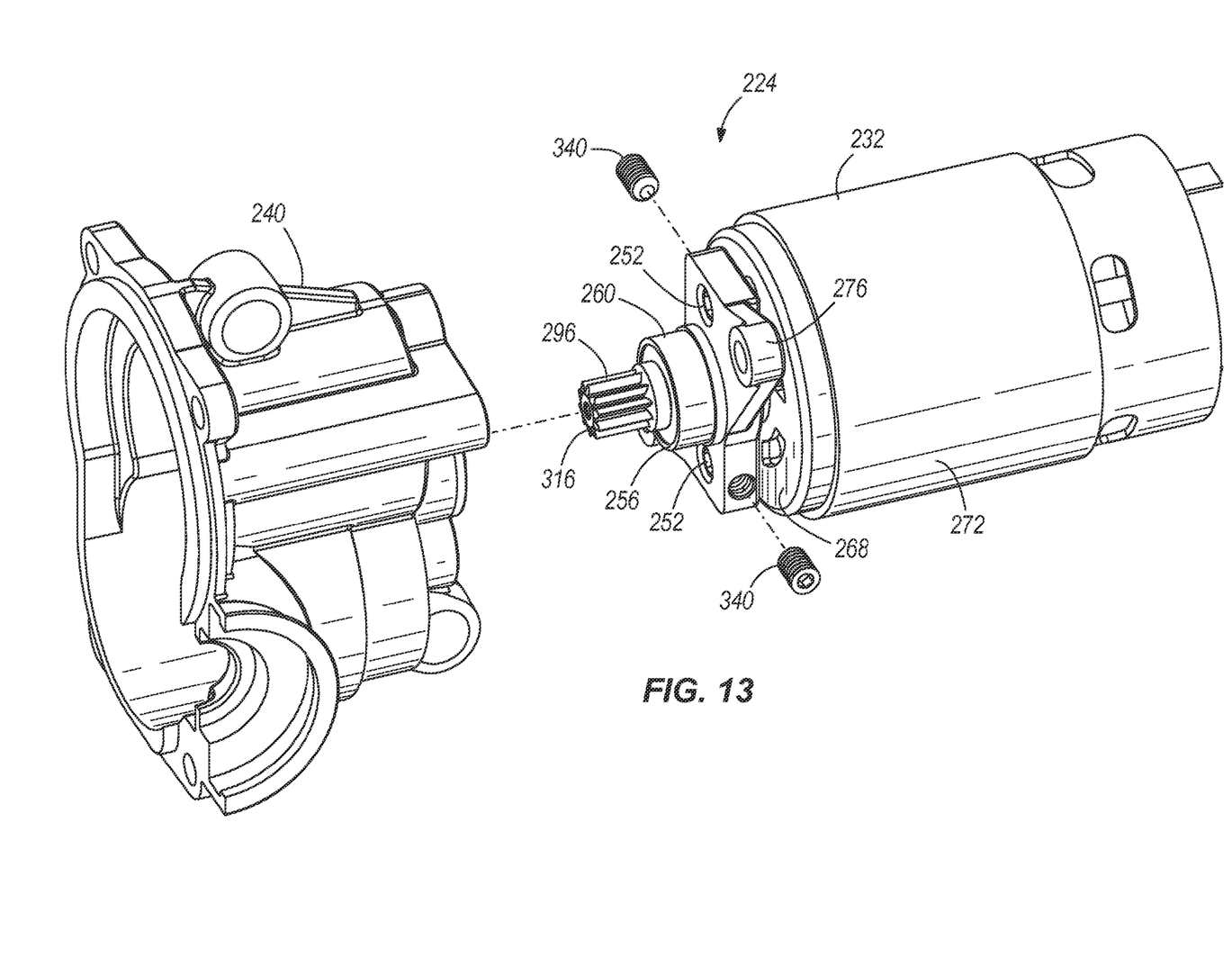
FIG. 13 is another exploded perspective view of the motor mounting system shown in FIG. 11.
Figure 14:
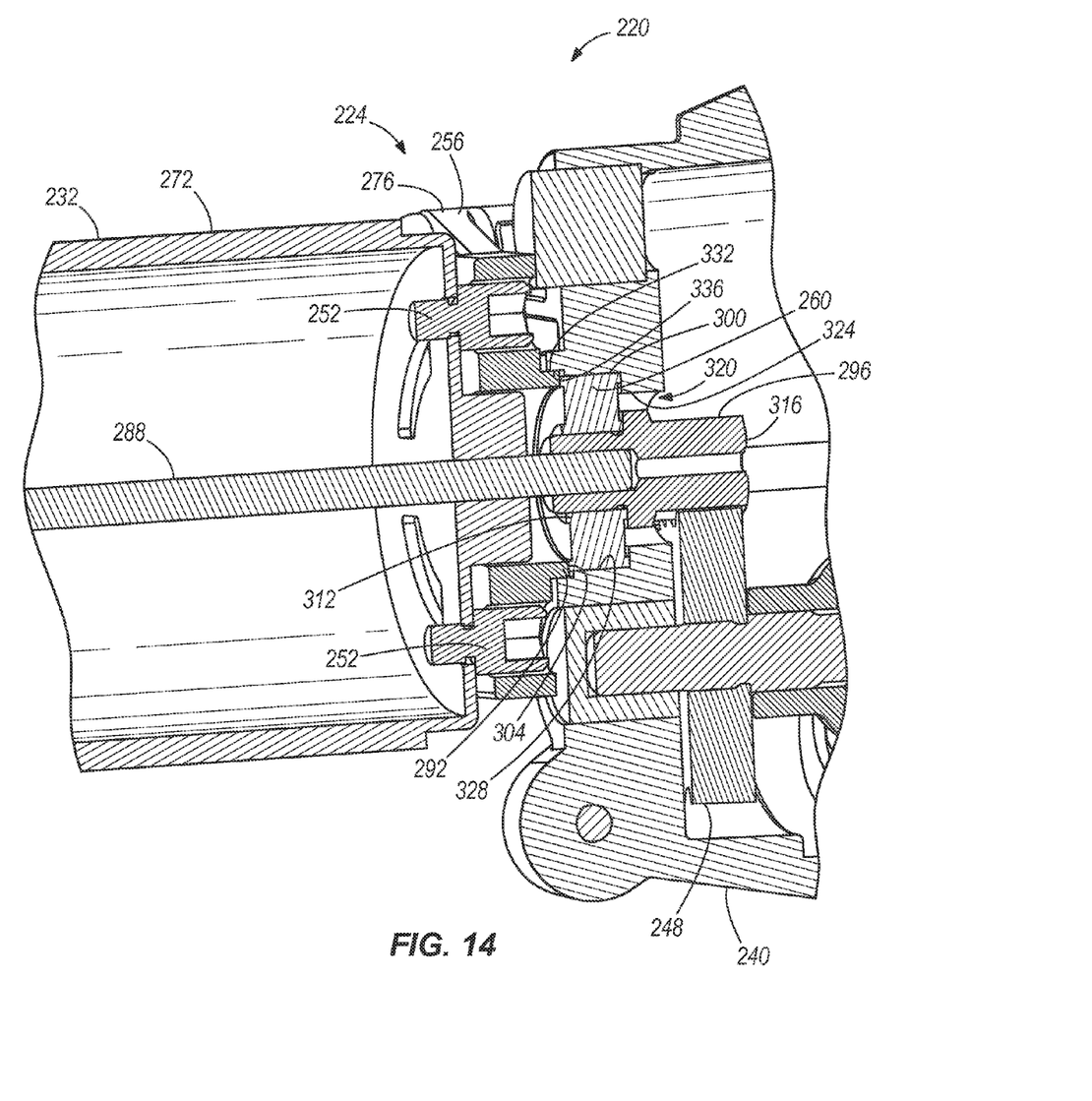
FIG. 14 is a cross-sectional view of the motor mounting system shown in FIG. 11.

The motor mounting system 224 is positioned within the housing 228 and mounts the motor 232 to the gear case 240. As shown in FIGS. 12-14, the motor mounting system 224 includes two shoulder pins 252, a motor mount 256, and a bearing 260. The shoulder pins 252 mount within openings 264 formed in an end surface 268 of a can 272 of the motor 232 and extend axially from the can 272.

The illustrated motor mount 256 is positioned on the end surface 268 of the motor can 272 and includes two radially-extending arms 276 that attach to the gear case 240, as further discussed below. The shoulder pins 252 extend into two openings 280 in the motor mount 256 to help position the motor mount 256 on the motor can 272. The motor mount 256 also defines a relatively large central opening 284 that provides clearance for a motor shaft 288 extending axially from the can 272. A flange 292, or lip, surrounds the central opening 284 and extends outwardly from the motor mount 256.

The bearing 260 and a motor pinion 296 are attached to the motor shaft 288, trapping the motor mount 256 between the motor can 272 and the bearing 260. As shown in FIG. 14, the bearing 260 surrounds the motor shaft 288 and engages the motor mount 256. In particular, an outer race 300 of the bearing 260 rests on an edge 304 of the flange 292 of the motor mount 256. A neck portion 308 of the motor pinion 296 extends through an inner race 312 of the bearing 260 and is fixed to the motor shaft 288 to rotate with the shaft 288. A gear portion 316 of the motor pinion 296 extends axially from the bearing 260 to engage the drive gear 248 of the drive mechanism 244.

Referring to FIG. 14, after the motor mount 256 and the bearing 260 are coupled to the can 272, the motor pinion 296 and the bearing 260 are inserted into an opening 320 formed in the gear case 240. The opening 320 is defined by a stepped inner surface 324 of the gear case 240. Upon insertion of the motor pinion 296, the outer race 300 of the bearing 260 engages a small diameter portion 328 of the inner surface 324 and an outer surface 332 of the flange 292 engages a large diameter portion 336 of the inner surface 324. In the illustrated embodiment, the outer surface 332 of the flange 292 and the outer race 300 of the bearing 260 are generally concentric and have similar diameters. The inner surface 324 of the gear case 240 directly contacts the outer race 300 of the bearing 260 to locate the gear case 240 on the bearing 260. In addition, the outer surface 332 of the motor mount flange 292 directly contacts the inner surface 324 of the gear case 240 to locate the motor mount 256 on the gear case 240. As such, the motor 232 and the gear case 240 both ultimately locate on the bearing 260 to maintain proper lateral alignment between the motor pinion 296 and the drive gear 248.

The arms 276 of the motor mount 256 are then connected to the gear case 240 by threaded fasteners (not shown). When attached to the gear case 240, the motor mount 256 presses against a first face of the bearing 260 and the gear case 240 presses against a second face of the bearing 260 so that the bearing 260 is sandwiched between the motor mount 256 and the gear case 240. Thus, the bearing 260 and the motor pinion 296 are axially fixed relative to the gear case 240.

Once the motor mount 256 is secured to the gear case 240, set screws 340 (FIG. 13) in the motor mount 256 are tightened to the shoulder pins 252. The set screws 340 help hold the motor 232 axially, radially, and laterally relative to the motor mount 256 and the gear case 240. The motor mount 256 thereby inhibits the motor 232 from sliding, rotating/spinning, or wobbling/pitching relative to the gear case 240 to maintain the motor can 272 in alignment with the motor shaft 288 and the bearing 260. In some embodiments, the motor mount 256 may only include a single set screw or the set screws 340 may be omitted.

Figure 15:
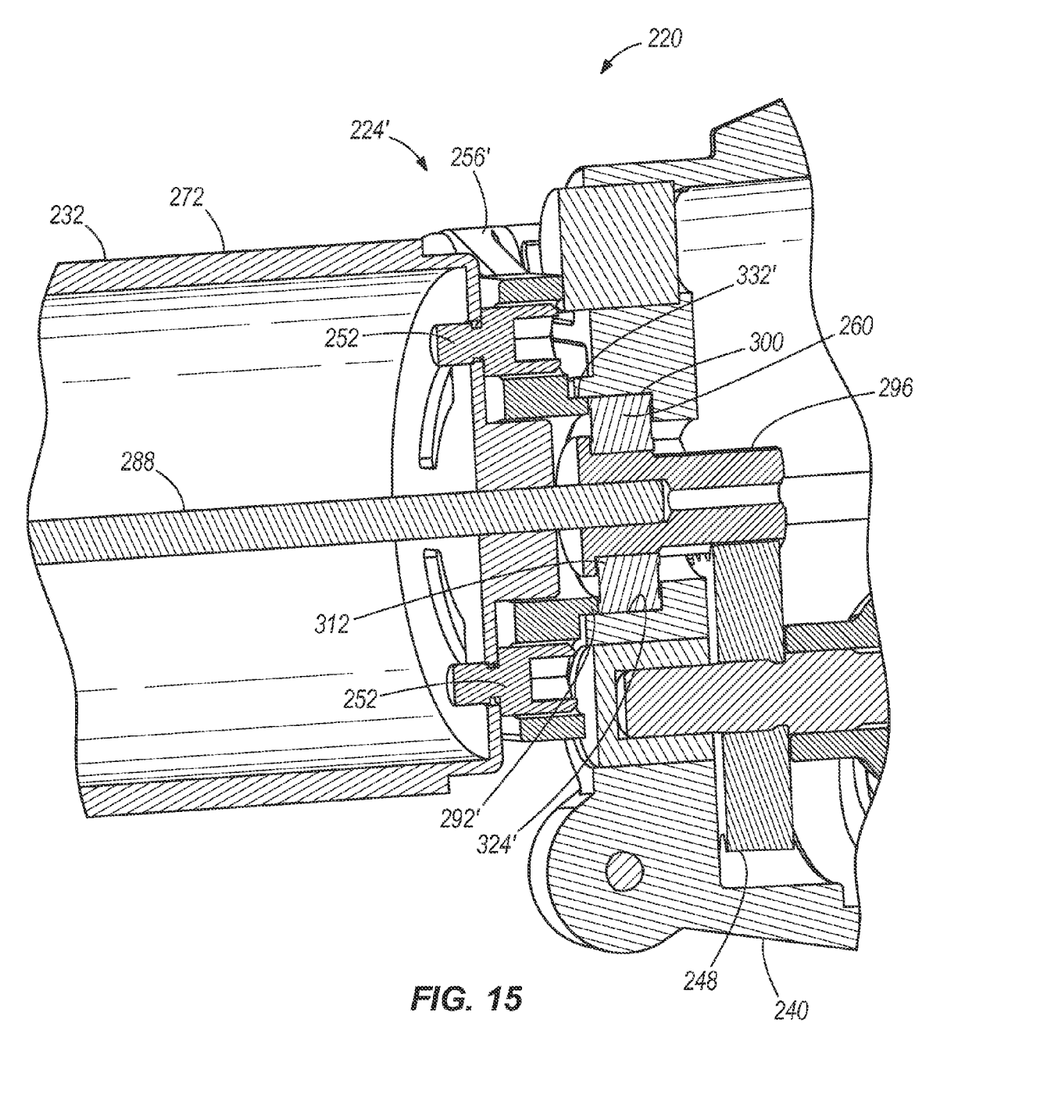
FIG. 15 is a cross-sectional view of another embodiment of a motor mounting system in use with the rotary hammer shown in FIG. 11.

FIG. 15 illustrates a portion of the power tool 220 that includes a modified motor mounting system 224'. The illustrated motor mounting system 224' is similar to the motor mounting system 224 discussed above, and only differences between the systems 224, 224' are described below.

In the illustrated embodiment, the system 224' includes a motor mount 256' having a flange 292' with an outer surface 332' that is generally concentric with and has a similar diameter to the outer race 300 of the bearing 260. In addition, the power tool 220 includes a gear case 240' having a continuous inner surface 324' rather than a stepped inner surface. That is, the inner surface 324' of gear case 240' that engages the bearing 260 and the motor mount 256' has a generally constant diameter instead of a smaller diameter portion and a larger diameter portion. In such an embodiment, the inner surface 324' of the gear case 240' directly contacts the outer race 300 of the bearing 260, while the outer surface 332' of the motor mount 256' directly contacts the inner surface 324' of the gear case 240'. The motor mount 256' thereby locates on the bearing 260 through the gear case 240' to maintain proper lateral alignment between the motor pinion 296 and the drive gear 248.

Figure 16:
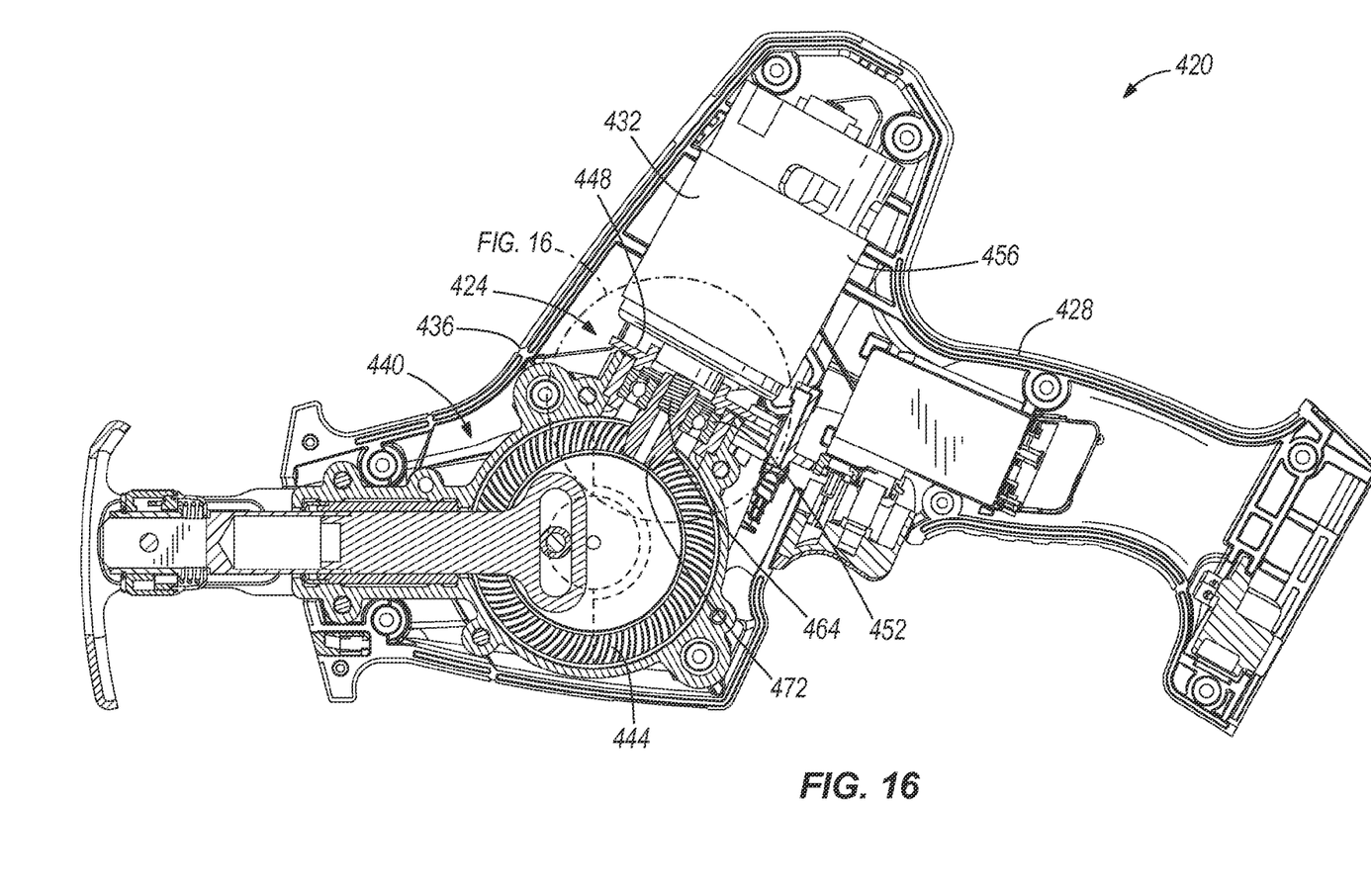
FIG. 16 is a cross-sectional view of a reciprocating saw, the reciprocating saw including yet another embodiment of a motor mounting system.

FIG. 16 illustrates another power tool 420 that includes a motor mounting system 424. In the illustrated embodiment, the power tool 420 is a reciprocating saw. The reciprocating saw 420 includes a housing 428, a motor 432 positioned substantially within the housing 428, a power source (not shown) electrically coupled to the motor 432, a gear case 436 positioned substantially within the housing 428, and a drive mechanism 440 supported by the gear case 436 and driven by the motor 432. The drive mechanism 440 includes a drive gear 444 and converts rotary motion of the motor 432 into linear reciprocating motion of an output member (e.g., a saw blade).

Figure 17:
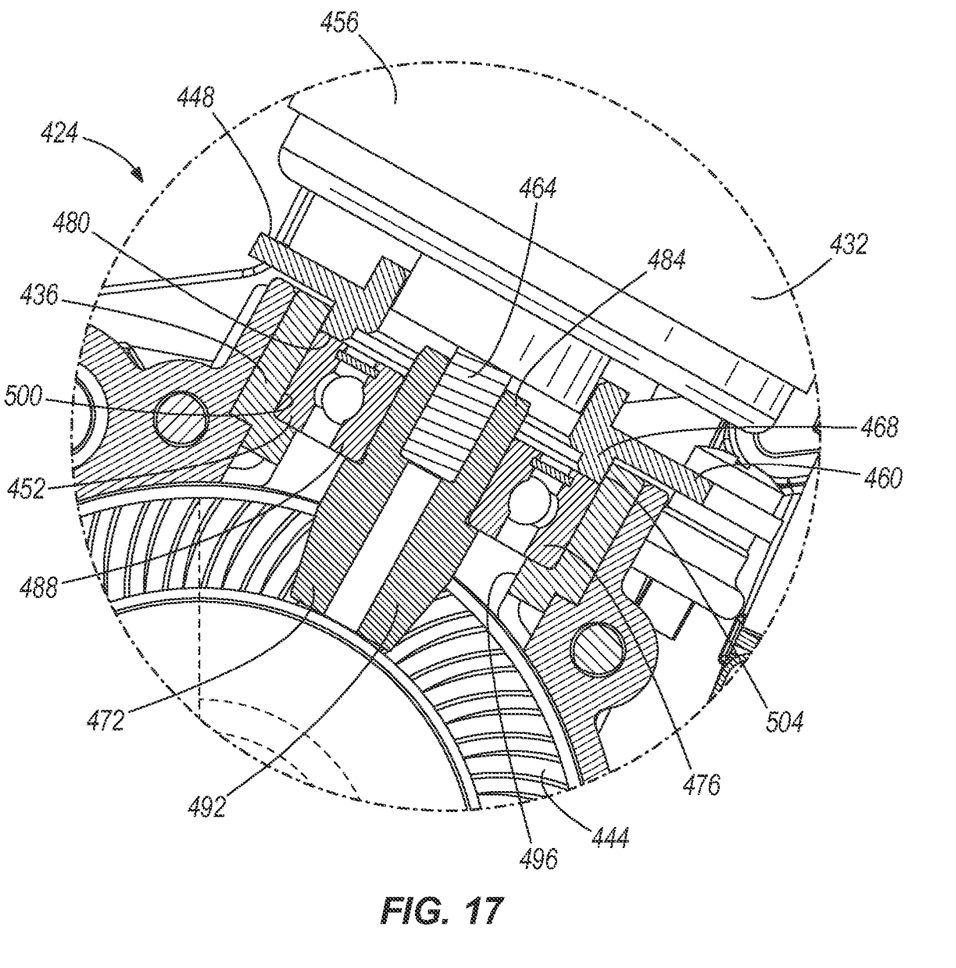
FIG. 17 is a cross-sectional view of the motor mounting system shown in FIG. 16.

As shown in FIG. 17, the motor mounting system 424 is positioned within the housing 428 and mounts the motor 432 to the gear case 436. The motor mounting system 424 includes two shoulder pins (not shown), a motor mount 448, and a bearing 452. Similar to the shoulder pins 60, 252 discussed above, the shoulder pins mount within openings formed in an end surface of a can 456 of the motor 432 and extend axially from the can 456.

The illustrated motor mount 448 is positioned on the end surface of the motor can 456 and includes two radially-extending arms 460 that attach to the gear case 436, as further discussed below. The shoulder pins extend into two openings in the motor mount 448 to help position the motor mount 448 on the motor can 456. The motor mount 448 also defines a relatively large central opening that provides clearance for a motor shaft 464 extending axially from the can 456. A flange 468, or lip, surrounds the central opening and extends outwardly from the motor mount 448.

The bearing 452 and a motor pinion 472 are attached to the motor shaft 464, trapping the motor mount 448 between the motor can 456 and the bearing 452. The bearing 452 surrounds the motor shaft 464 and engages the motor mount 448. In particular, an outer race 476 of the bearing 452 rests on an edge 480 of the flange 468 of the motor mount 448. A neck portion 484 of the motor pinion 472 extends through an inner race 488 of the bearing 452 and is fixed to the motor shaft 464 to rotate with the shaft 464. A gear portion 492 of the motor pinion 472 extends axially from the bearing 452 to engage the drive gear 444 of the drive mechanism 440.

After the motor mount 448 and the bearing 452 are coupled to the can 456, the motor pinion 472 and the bearing 452 are inserted into an opening 496 formed in the gear case 436. The opening 496 is defined by a continuous inner surface 500 of the gear case 436. That is, the inner surface 500 has a generally constant diameter. Upon insertion of the motor pinion 472, the outer race 476 of the bearing 452 and an outer surface 504 of the flange 468 engage the inner surface 500. In the illustrated embodiment, the outer surface 504 of the flange 468 and the outer race 476 of the bearing 452 are generally concentric and have similar diameters. The inner surface 500 of the gear case 436 directly contacts the outer race 476 of the bearing 452 to locate the gear case 436 on the bearing 452. In addition, the outer surface 504 of the motor mount flange 468 directly contacts the inner surface 500 of the gear case 436 to locate the motor mount 448 on the gear case 436. The bearing 452 and the motor mount 448 are therefore concentrically aligned on the same surface of the gear case 436. As such, the motor 432 and the gear case 436 both ultimately locate on the bearing 452 to maintain proper lateral alignment between the motor pinion 472 and the drive gear 444.

The arms 460 of the motor mount 448 are then connected to the gear case 436 by threaded fasteners (not shown). When attached to the gear case 436, the motor mount 448 presses against a first face of the bearing 452 and the gear case 436 presses against a second face of the bearing 452 so that the bearing 452 is sandwiched between the motor mount 448 and the gear case 436. Thus, the bearing 452 and the motor pinion 472 are axially fixed relative to the gear case 436.

Once the motor mount 448 is secured to the gear case 436, set screws (not shown) in the motor mount 448 are tightened on the shoulder pins. The set screws help hold the motor 438 axially, radially, and laterally relative to the motor mount 448 and the gear case 436. The motor mount 448 thereby inhibits the motor can 432 from sliding, rotating/spinning, or wobbling/pitching relative to the gear case 436 to maintain the motor can 456 in alignment with the motor shaft 464 and the bearing 452. In some embodiments, the motor mount 448 may only include a single set screw or the set screws may be omitted.

The above-described motor mounting systems help rigidly fix a motor both axially and laterally relative to a gear box within a power tool, counteracting excessive wear and damage that may occur from vibrations during use. The motor mounting systems also hold a pinion bearing in place in a manner that does not allow the bearing's outer race to spin while the motor is running In addition, the motor mounting systems help achieve proper axial alignment between a motor and a gear box to reduce side-loading and other performance-affecting issues with designs that are capable of being mass produced in high-speed industrial assembly environments.

Although the invention has been described with reference to certain preferred embodiments, variations and modifications exist within the scope and spirit of one or more independent aspects of the invention. For example, although each of the motor mounting systems 24, 224, 224', 424 is illustrated and described with reference to a different, specific power tool, the motor mounting systems 24, 224, 224', 424 may be interchanged between any of the illustrated power tools 20, 220, 420 or may be used with other power tools.

Various features and advantages of the invention are set forth in the following claims.

The invention claimed is:

1. A power tool comprising:
a motor including a can and a shaft extending axially from the can;
a gear case including an inner surface that defines an opening;
a bearing positioned around a portion of the shaft that extends from the can and at least partially within the opening in the gear case; and
a motor mount coupled to the motor, the motor mount including a flange extending away from the motor;
wherein the flange of the motor mount and the inner surface of the gear case axially and laterally locate the motor and the gear case on the bearing.

2. The power tool of claim 1, wherein the inner surface of the gear case directly contacts an outer race of the bearing to locate the gear case on the bearing.

3. The power tool of claim 2, wherein the flange includes an inner surface that directly contacts the outer race of the bearing to locate the motor on the bearing.

4. The power tool of claim 3, wherein the inner surface of the gear case and the inner surface of the flange are generally concentric and have similar diameters.

5. The power tool of claim 2, wherein the flange includes an outer surface that directly contacts the inner surface of the gear case to locate the motor on the bearing.

6. The power tool of claim 5, wherein the outer surface of the flange and the outer race of the bearing are generally concentric and have similar diameters.

7. The power tool of claim 6, wherein the inner surface of the gear case is generally continuous.

8. The power tool of claim 1, wherein the bearing includes a first face and a second face, and wherein the first face of the bearing contacts the motor mount and the second face of the bearing contacts the gear case.

9. The power tool of claim 1, wherein the motor includes a pinion coupled to the portion of the shaft that extends from the can, and wherein the bearing includes an inner race that is secured to the pinion.

10. The power tool of claim 9, wherein the inner race of the bearing is press-fit onto the pinion.

11. The power tool of claim 1, wherein the motor mount includes two radially-extending arms, and wherein the two arms are secured to the gear case to couple the motor mount to the gear case.

12. The power tool of claim 11, wherein the two radially-extending arms are flexed toward the gear case to apply a load to the bearing.

13. The power tool of claim 11, wherein the two radially-extending arms are secured to the gear case with threaded fasteners.

14. The power tool of claim 1, further comprising two shoulder pins coupled to the can of the motor, wherein the two shoulder pins extend into the motor mount to couple the motor mount to the motor.

15. The power tool of claim 14, wherein the motor mount includes a set screw, and wherein the set screw engages one of the two shoulder pins to inhibit movement of the motor mount relative to the motor.

16. A method of connecting a motor to a gear case of a power tool, the motor including a can and a shaft that extends axially from the can, the gear case including an inner surface that defines an opening, the method comprising:
- providing a motor mounting system including a motor mount and a bearing, the motor mount having a flange;
- coupling the motor mount to the motor such that the flange extends away from the motor;
- positioning the bearing around a portion of the shaft of the motor that extends from the can;
- inserting at least a portion of the bearing into the opening in the gear case;
- axially and laterally locating the gear case on the bearing with the inner surface of the gear case; and
- axially and laterally locating the motor on the bearing with the flange of the motor mount.

17. The method of claim 16, wherein locating the gear case on the bearing includes directly contacting an outer race of the bearing with the inner surface of the gear case.

18. The method of claim 17, wherein the motor mount includes a flange having an inner surface, and wherein locating the motor on the bearing includes directly contacting the outer race of the bearing with the inner surface of the flange.

19. The method of claim 17, wherein the motor mount includes a flange having an outer surface, and wherein locating the motor on the bearing includes directly contacting the inner surface of the gear case with the outer surface of the flange.

20. The method of claim 16, further comprising attaching a pinion to the portion of the shaft of the motor that extends from the can, and securing an inner race of the bearing to the pinion.

21. The method of claim 16, wherein the motor mount includes two radially-extending arms, and further comprising securing the two arms to the gear case to couple the motor mount to the gear case.

22. The method of claim 21, further comprising flexing the radially-extending arms toward the gear case to apply a load to the bearing.

23. The method of claim 16, wherein providing the motor mounting system also includes providing two shoulder pins, and further comprising coupling the two shoulder pins to the can of the motor, wherein coupling the motor mount to the motor includes positioning the motor mount on the motor such that the two shoulder pins extend into the motor mount.

24. The method of claim 23, wherein the motor mount includes a set screw that engages one of the two shoulder pins, and further comprising tightening the set screw to inhibit movement of the motor mount relative to the motor.

25. A power tool comprising:
- a housing;
- a motor positioned substantially within the housing, the motor including a can, a shaft extending axially from the can, and a pinion coupled to a portion of the shaft that extends from the can;
- a gear case positioned substantially within the housing, the gear case including an inner surface that defines an opening;
- a bearing positioned around the portion of the shaft that extends from the can and at least partially within the opening in the gear case, the bearing including an inner race that is secured to the pinion and an outer race;
- a motor mount including a flange extending away from the motor and two radially-extending arms, the two arms being secured to the gear case; and
- two shoulder pins coupled to the can of the motor, the two shoulder pins extending into the motor mount to couple the motor mount to the motor;
- wherein the inner surface of the gear case directly contacts the outer race of the bearing to axially and laterally locate the gear case on the bearing, and wherein the flange of the motor mount directly contacts one of the outer race of the bearing and the inner surface of the gear case to axially and laterally locate the motor on the bearing.

26. The power tool of claim 25, wherein the flange includes an inner surface that directly contacts the outer race of the bearing to locate the motor on the bearing.

27. The power tool of claim 25, wherein the flange includes an outer surface that directly contacts the inner surface of the gear case to locate the motor on the bearing.

28. The power tool of claim 25, wherein the bearing includes a first face and a second face, and wherein the first face of the bearing contacts the motor mount and the second face of the bearing contacts the gear case.

29. The power tool of claim 25, wherein the two radially-extending arms of the motor mount are flexed toward the gear case to apply a load to the bearing.

30. The power tool of claim 25, wherein the motor mount includes a set screw, and wherein the set screw engages one of the two shoulder pins to inhibit movement of the motor mount relative to the motor.

* * * * *